United States Patent [19]

Segeral et al.

[11] Patent Number: 5,591,922
[45] Date of Patent: Jan. 7, 1997

[54] METHOD AND APPARATUS FOR MEASURING MULTIPHASE FLOWS

[75] Inventors: Gerard Segeral, Gif-sur-Yvette, France; Peter Long, Harlton, Great Britain; Ian Atkinson, Bailly, France

[73] Assignee: Schlumberger Technology Corporation, Ridgefield, Conn.

[21] Appl. No.: 442,256

[22] Filed: May 16, 1995

[30] Foreign Application Priority Data

May 27, 1994 [FR] France ................... 94 06453

[51] Int. Cl.$^6$ .............................................. G01F 1/74
[52] U.S. Cl. ................... 73/861.04; 73/861.42
[58] Field of Search ................ 73/861.04, 861.42, 73/861.66, 861.72

[56] References Cited

U.S. PATENT DOCUMENTS

| | | | |
|---|---|---|---|
| 4,397,190 | 8/1983 | Hulin | 73/861.04 |
| 4,429,581 | 2/1984 | Furmaga | 73/861.04 |
| 4,776,210 | 10/1988 | Baillie et al. | 73/861.04 |
| 4,856,344 | 8/1989 | Hunt | 73/861.04 |
| 4,974,542 | 12/1990 | Hayashi et al. | 118/722 |
| 5,099,697 | 3/1992 | Agar | 73/861.04 |
| 5,287,752 | 2/1994 | Den Boer | 73/861.04 |
| 5,390,547 | 2/1995 | Liu | 73/861.04 |

FOREIGN PATENT DOCUMENTS

| | | | |
|---|---|---|---|
| 388810 | 9/1989 | Austria | G01F 1/88 |
| 0031744 | 7/1981 | European Pat. Off. | G01P 5/18 |
| 2085979 | 12/1971 | France | G01P 5/00 |
| 2649790 | 1/1991 | France | G01F 1/88 |
| 60001522 | 1/1985 | Japan | G01F 1/34 |
| 1272152 | 4/1972 | United Kingdom | G01N 15/06 |
| 1461537 | 1/1977 | United Kingdom | G01F 1/88 |
| WO93/19347 | 9/1993 | WIPO |  |
| WO93/17305 | 9/1993 | WIPO |  |
| WO93/24811 | 12/1993 | WIPO |  |

OTHER PUBLICATIONS

SPE Paper 23065 of Gold et al. entitled, "Measurement of Multiphase Well Fluids by Positive Displacement Meter" no date!
SPE Paper 25620 of Cary et al. entitled, "New Well Testing Technology: A Portable Three-Phase Test Unit" no date!
Brown, D. and Boer, J.J. den, "Simple Full–Bore Water–Cut Measurement Technique", North Sea Flow Measurement Workshop 1990, 23–25 Oct. 1990, National Engineering Laboratory East Kilbride, Glasgow, Paper 6.2.
R. Frank, J. Reimann and M. John, "Mass Flow Rate and Quality Measurements with a Venturi Nozzle and a Turbine Meter in Stream–Water Flow", Paper A3, European Two Phase Flow Group Meeting, University of Strathclide, Glasgow, 3rd–6 Jun. 1980.

*Primary Examiner*—Richard Chilcot
*Assistant Examiner*—Max H. Noori
*Attorney, Agent, or Firm*—Martin D. Hyden; Keith G. W. Smith; Brigitte L. Jeffery

[57] ABSTRACT

A device for measuring flow rate of multiphase fluids such as oilwell effluents, containing liquid hydrocarbons, gas, and water includes first and second sections situated at a distance one from the other in the flow direction, each including a passage provided with structure such as venturis for inducing a change of speed therein, and respective means for measuring the resulting pressure differences, the pressure difference signals obtained in the respective sections being suitable for cross-correlation to produce a signal representative of the total volume flow rate.

30 Claims, 6 Drawing Sheets

FIG_1

FIG_2

FIG_3

FIG._4

FIG_6
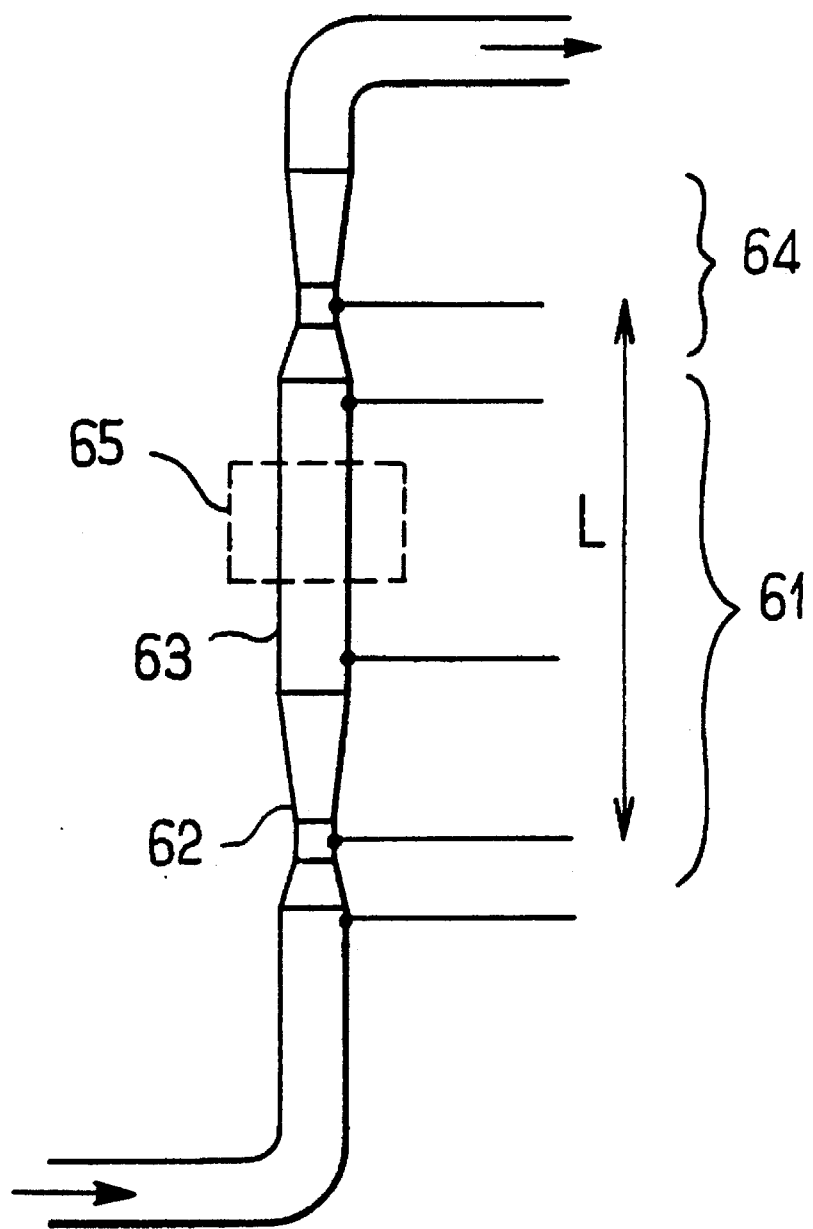

METHOD AND APPARATUS FOR MEASURING MULTIPHASE FLOWS

FIELD OF THE INVENTION

The present invention relates in general to studying the flow characteristics of multiphase fluids, especially fluids having three phases. In particular, the invention relates to measuring the flows of fluids such as oil effluents composed of crude oil, water, and gas.

BACKGROUND OF THE INVENTION

The problems associated with measuring flow rate in a multiphase fluid are well known. The techniques that can be applied to flows of a single phase such as systems including a turbine or the like turn out to be unsuitable in multiphase flows, and consequently it is often necessary to perform a plurality of measurements in order to be able to obtain a result that is accurate with respect to the volume flow rates of the various phases. In the oil and gas industry, and in comparable industries, it is common practice to measure multiphase flows, and in a production well, it is usual for the fluid products to comprise a mixture of oil, of water, and often of gas. Given that it is important to determine the volume flow rates of the individual phases at certain time intervals throughout the lifetime of the well, in order to determine whether any corrective action is required to improve or restore the productivity of the well, and also to determine exactly how much oil is being produced, various methods have been proposed in the prior art for measuring flow rates in multiphase flows. In conventional manner, when testing exploration wells, the fluids are sent to separators and the volumes of each phase are determined separately. However, that requires an installation that is voluminous and expensive and it does not make it possible to obtain information instantaneously about the production of the well.

Proposals have also been made to combine a venturi type device, a gamma ray densitometer, and a turbine meter (R. Franck et al., European Two Phase Flow Group Meeting, University of Strathclyde, Glasgow, Jun. 3–6, 1980). That system was developed for two-phase flows (water/steam) and is not capable of measuring thre-phase flows.

U.S. Pat. Nos. 4,856,344 and 4,974,542 describe multiphase flow rate measurement devices of the gradio-venturi type which, by means of differential pressure measurements distributed along the length of the device, provide information relating to the flow rates of the phases.

A gradio-venturi combines a section that measures a static pressure gradient and a section that measures variation in momentum. That device provides accurate measurement, in particular for the oil-water and oil-gas flows encountered in the oil industry. Nevertheless, it has been observed that measurement accuracy is limited once the proportion of gas by volume exceeds 60% to 70%.

Various systems for measuring multiphase flows are proposed in British patents 1,272,152 and 1,461,537, and in the document 6.2 North Sea Flow Measurement Work shop 1990, National Engineering Laboratory, Glasgow, entitled "Simple full -bore water-cut measurement technique" by D. Brown and JJ. der Boer. In each case, the apparatus described is in the form of an upside-down U-shape and pressure measurements are performed at various heights along each of the branches of the U-shape and then compared to determine the parameters of the flow. Given that none of the measurements relates to changes in dynamic pressure, it is not possible to calculate the individual flow rate of each phase on the basis of those pressure measurements alone.

Patent application WO 93/17305 describes a combination of two gradio-venturis disposed in sections where the effect of gravity makes it possible to measure the density of the mixture. In addition, means are provided for measuring the water fraction and to extract a full sample of the mixture. That system is fully capable of measuring multiphase flows, but it likewise suffers from a limit in terms of measurement accuracy once the volume fraction of the gas exceeds 60% to 70%.

Patent application WO 93/19347 describes a multiphase flow meter associating in series a volume-measuring flow meter and two flow-measuring sensors responsive to the momentum of the measured fluids, and in which the ratio of gas speed to liquid speed is maintained at a constant value, e.g. equal to 1. The volume-measuring flow meter consists, for example, in a turbine or in a flow meter having oval gears. Such an intrusive type of device suffers from well-known drawbacks. In addition, keeping the ratio of gas speed to liquid speed at a constant value constitutes an awkward constraint.

Mention may also be made of the following documents concerning flow rate measurements in nultiphase flows of the oil effluent type: SPE publication 23065 by Gold et al., entitled "Measurement of multiphase well fluids by positive displacement meter"; SPE publication 25620 by Cary et al., entitled "New well testing technology: a portable three-phase test unit"; patent application WO 93/24811; and U.S. Pat. No. 5,287,752. Finally, mention is made of U.S. Pat. No. 4,397,190 which describes a device adapted to making measurements in production wells.

The present invention seeks to perform flow rate measurements on multiphase fluids, and more particularly on oilwell effluents, which may have a gas content exceeding 80% or even 90%.

SUMMARY OF THE INVENTION

In a first aspect, the present invention provides a method of measuring flow rate for a multiphase fluid, such as the effluent of an oil well, which may contain a mixture of liquid hydrocarbons, gas, and water, comprising the steps of:

changing the flow velocity respectively in a first section and in a second section spaced from each other in the flow direction;

measuring a first and a second pressure differences along respectively said first and said second sections to obtain first and second pressure difference signals; and comparing said first and second pressure difference signals to derive a third signal indicative of the total volume flow rate q.

Preferably said third signal is formed by cross-correlation between the first and second pressure different signals.

In accordance with a further aspect, in order to determine the flow rates of the phases, a third pressure difference is measured in a flow section to obtain a fourth signal that is a function of the total mass of flow rate Q and of the density ρ of the mixture, and a fifth signal is formed representative of said density ρ.

On the basis of the above information, in another aspect of the invention, two possible values for the total mass flow rate Q are formed: a first value from the fourth signal which is a function both of the total mass flow rate Q and of the density ρ of the fluid, and from the fifth signal which is representative of the density ρ; and a second value from said fourth signal and from the third signal which is representative of the total volume flow rate q the first value being appropriate when the gas fraction of the fluid is moderate and the second value being appropriate when the gas fraction is high.

BRIEF DESCRIPTION OF THE DRAWINGS

The invention will be well understood from reading the following description made with reference to the accompanying drawings, listed as follows:

FIG. 6 shows another possible disposition.

DESCRIPTION OF THE PREFERRED EMBODIMENT

Figure 1:
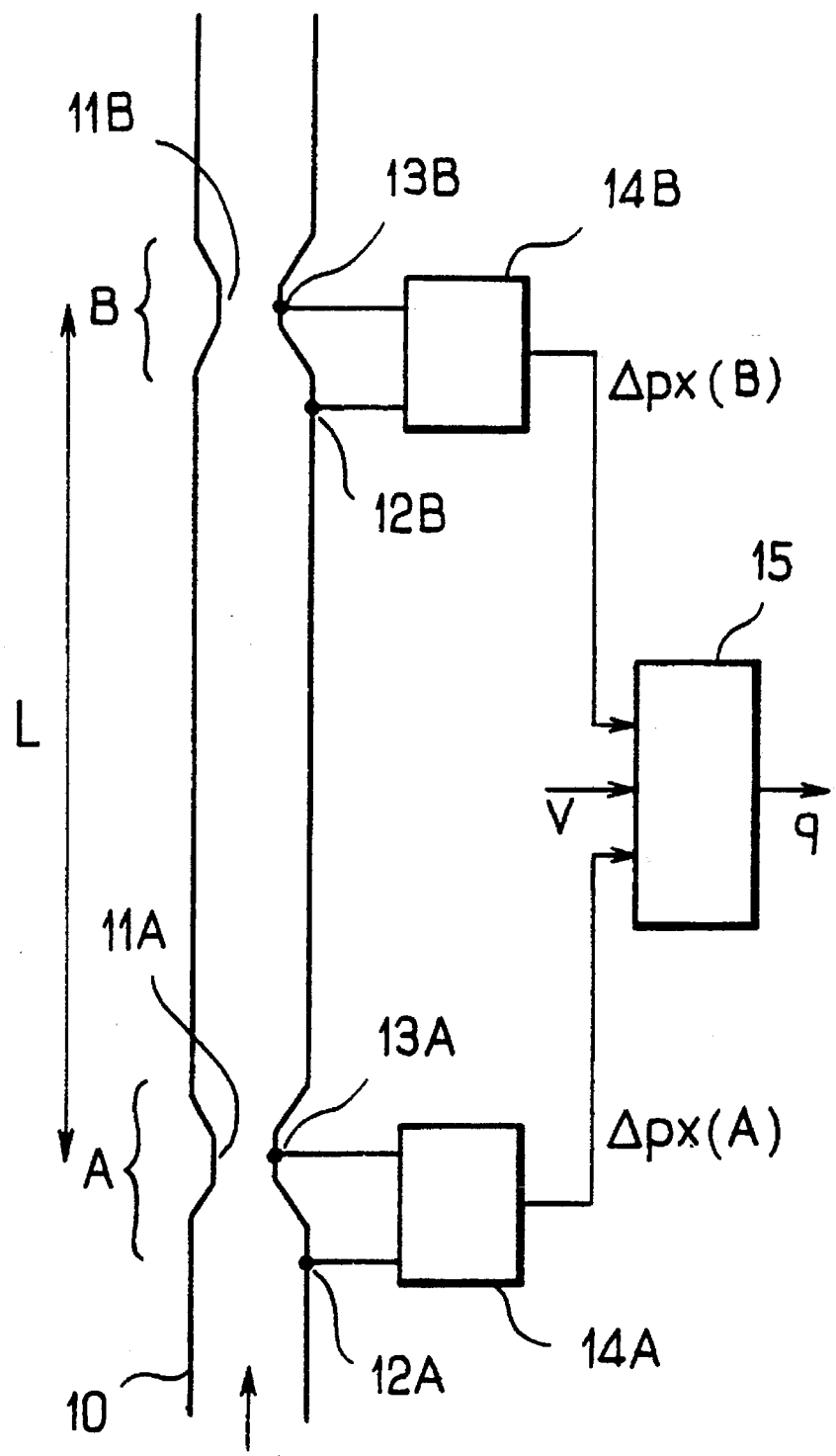
FIG. 1 is a diagram of a device providing an indication of total flow rate.

FIG. 1 shows a duct 10 along which a multiphase fluid flows in the direction of the arrow, which fluid may be an effluent from an oil well and composed of a mixture of crude oil (referred to below merely as "oil"), gas, and water.

Two measurement sections A and B are provided along said duct separated by a distance L defined in the flow direction, the distance L corresponding to a volume of fluid V (assuming that the duct is of constant section S, then V=L.S). Each measurement section includes means for inducing a change in the fluid velocity, represented in the form of venturis 11A and 11B each forming a constriction in the flow cross-section. Each venturi is associated with a pair of pressure takeoffs spaced from each other in the flow direction. The sections A and B thus include the following pressure takeoffs respectively: 12A, 13A, and 12B, 13B. Each pair of pressure takeoffs is connected to a respective differential pressure sensor 14A, 14B responsive to the pressure difference generated in each section. The sensors 14A, 14B provide respective signals ΔpX(A) and ΔpX(B).

These signals are applied to a cross-correlation device 15 which, using a technique that is known per se, determines the time lag τ corresponding to maximum correlation between the signals coming from the sections A and B. Given the volume V between the sections A and B, the time lag determined in this way makes it possible to determine the total volume flow rate q which is inversely proportional to time τ.

It will be noted that in the embodiment shown in FIG. 1, the pressure takeoffs are located respectively upstream from the constriction and in the constriction. However, other arrangements are possible. For instance, the pressure takeoffs may be located respectively in the constriction and downstream of the constriction. It is also possible to provide pressure takeoffs located respectively upstream and downstream of the constriction, in which case the pressure difference will be based on the pressure drop entailed by the venturi. These alternative arrangements of pressure takeoffs may be used also with the other embodiments described hereinbelow.

Means other than venturis can be used, e.g. devices having orifices. Such means could be considered. It is possible to consider using means of different types in the sections A and B; however for correlation purposes it is preferable to use means that are of the same type, and better still that are identical.

Figure 2:
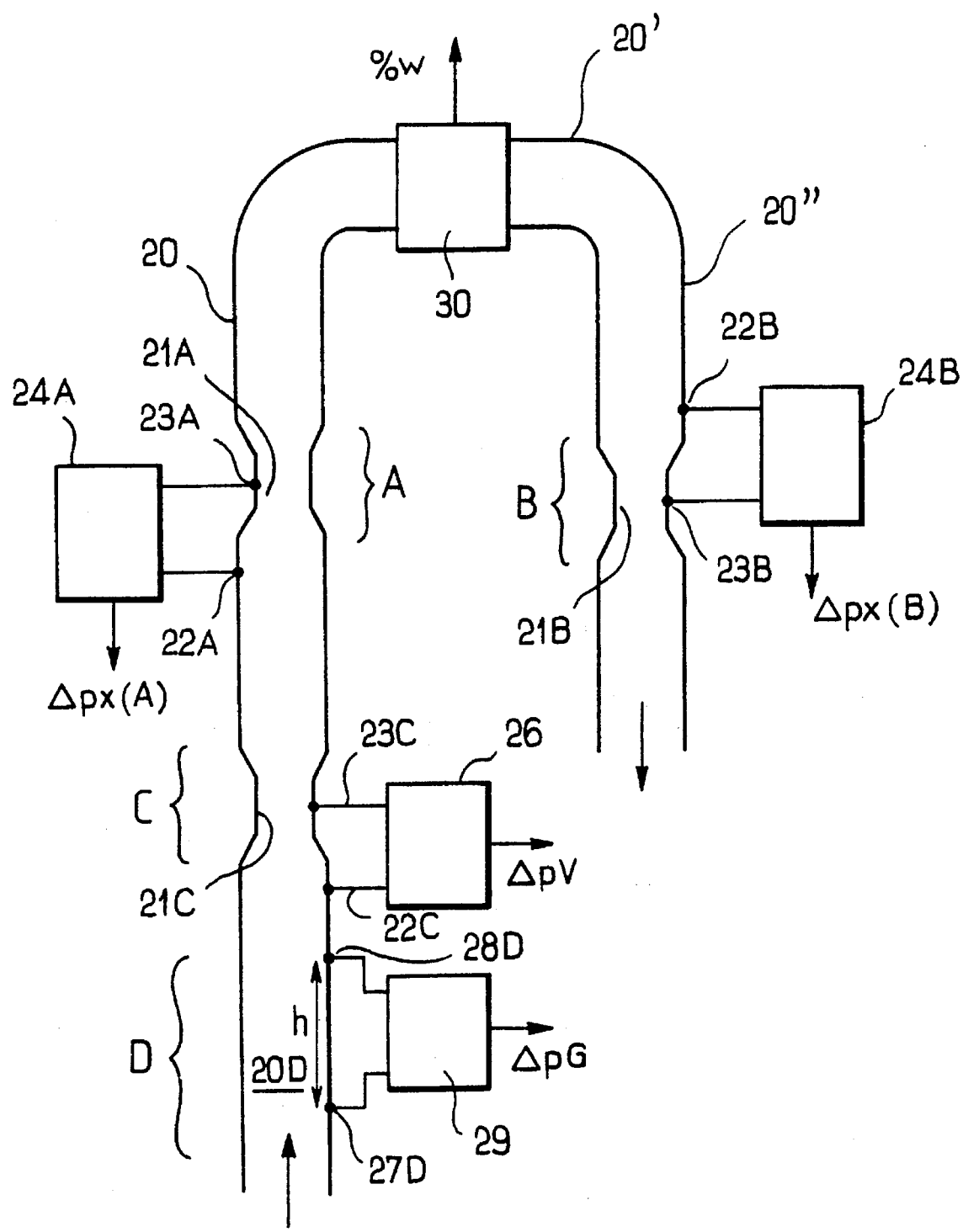
FIG. 2 is a diagram of a device providing a set of measurements for determining the flow rates of each phase in a three-phase fluid such as the effluent of an oil well.

The geometrical disposition of the sections A and B may be implemented in different manners: the sections may be disposed in a duct that is horizontal, or vertical, or one section may be placed in a vertical portion of duct while the other is in a horizontal portion, or indeed, as shown in FIG. 2, section A may be placed in a vertical portion where the flow is up while section B is in a vertical portion where the flow is down.

The distance L which determines the volume V is selected in appropriate manner as a function of the expected range of flow rates: it should be short for low flow rates and longer if higher flows are expected.

In order to enlarge the dynamic range of the device, a third measurement section (not shown) may be provided similar to the sections A and B and situated at a distance L' from the section A corresponding to a volume V' of fluid that is different from V. For example, if the volume V is appropriate for relatively small flow rates, then a volume V' greater than V will be appropriate for larger flow rates. The signal from the sensor associated with the third section is substituted for that coming from the section B, as a function of the flow rate values as expected or measured.

Concerning correlation techniques as applied to flow rate measurement, mention may be made of the work by M. S. Beck and A. Plaskowski "Cross-correlation flow meters— their design and applications", Adam Hilger, 1987. It may be observed that for determining the time τ, there exist methods other than cross-correlation for comparing the signals such as the signals delivered by the sections A and B. Reference may be made on this topic to the literature on signal processing.

In the study of multiphase fluids, the device described has the advantage of a large dynamic range concerning the proportion of gas and liquid in the fluid, and it is of moderate cost.

The device shown diagrammatically in FIG. 2 provides information that enables the flow rate of each phase in a three-phase fluid such as oil well effluent to be determined. The device as shown comprises a portion of duct 20 where the flow is upwards, a portion of duct 20' where the flow is horizontal, and a portion of duct 20" where the flow is downwards.

A device of the type shown in FIG. 1 is provided that comprises measurement sections A and B respectively comprising venturis 21A and 21B, pairs of pressure takeoffs 22A, 23A and 22B, 23B, and differential pressure sensors 24A, 24B. The sections A and B are situated respectively in the up portion 20 and in the down portion 20", however as explained above they could be placed differently, providing the volume of fluid V that corresponds to the distance L between them in the flow direction is appropriate.

A gradio-venturi type device is also provided that comprises a measurement section C and a measurement section D situated in the portion of duct 20 where the fluid flows upwards.

The section C is provided with means for creating dynamic pressure such as the venturi 21C (however it would also be possible to use a device having orifices or the like) and with pressure takeoffs 22C and 23C placed upstream from the venturi and at the venturi, and a differential pressure sensor 26 is connected to the pressure takeoffs 22C and 23C. The differential pressure signal ΔpV provided by the sensor 26 is a function of the total mass flow rate Q and of the density ρ of the mixture, and more precisely, to a first approximation, it is proportional to the expression $Q^2/\rho$.

Section D of the "gradiomanometer" type includes a portion of duct 20D that is of constant section, together with two pressure takeoffs 27D and 28D that are spaced apart by a distance h in the (vertical) direction of the flow. These pressure takeoffs are connected to a differential pressure sensor 29 that produces a signal ΔpG. In conventional manner, the difference in level between the pressure takeoffs, equal to the distance h for a vertical duct, creates a static pressure difference that is proportional, to a first approximation, to the density ρ of the mixture.

The device shown also includes a device 30 that provides one or more indications about the composition of the multiphase fluid, in other words relating to the proportions by volume or by mass of the phases constituting the fluid. For convenience, this device is shown in FIG. 2 as being situated in the horizontal portion of duct 20', however such a disposition is not essential.

In the above-mentioned case of oil well effluent (a mixture of water, oil and gas) there exist various apparatuses for determining composition, and more particularly for determining water fraction, which apparatuses implement various physical principles: nuclear methods (interaction with gamma rays), electromagnetic (microwaves), etc. The measurements may also be performed in various different ways: directly on the flow, or on samples taken from a shunt flow, as described in patent application WO 93/17305. Depending on the technique used, it is possible to obtain an indication of the water fraction in terms of the ratio of water to all of the liquid phases combined (WLR), which comes to the same as obtaining the water/oil ratio (WOR); or else the water hydrocarbon cut (WHC) is obtained, i.e. the fraction of water relative to all of the hydrocarbons (oil+gas).

Figure 3:
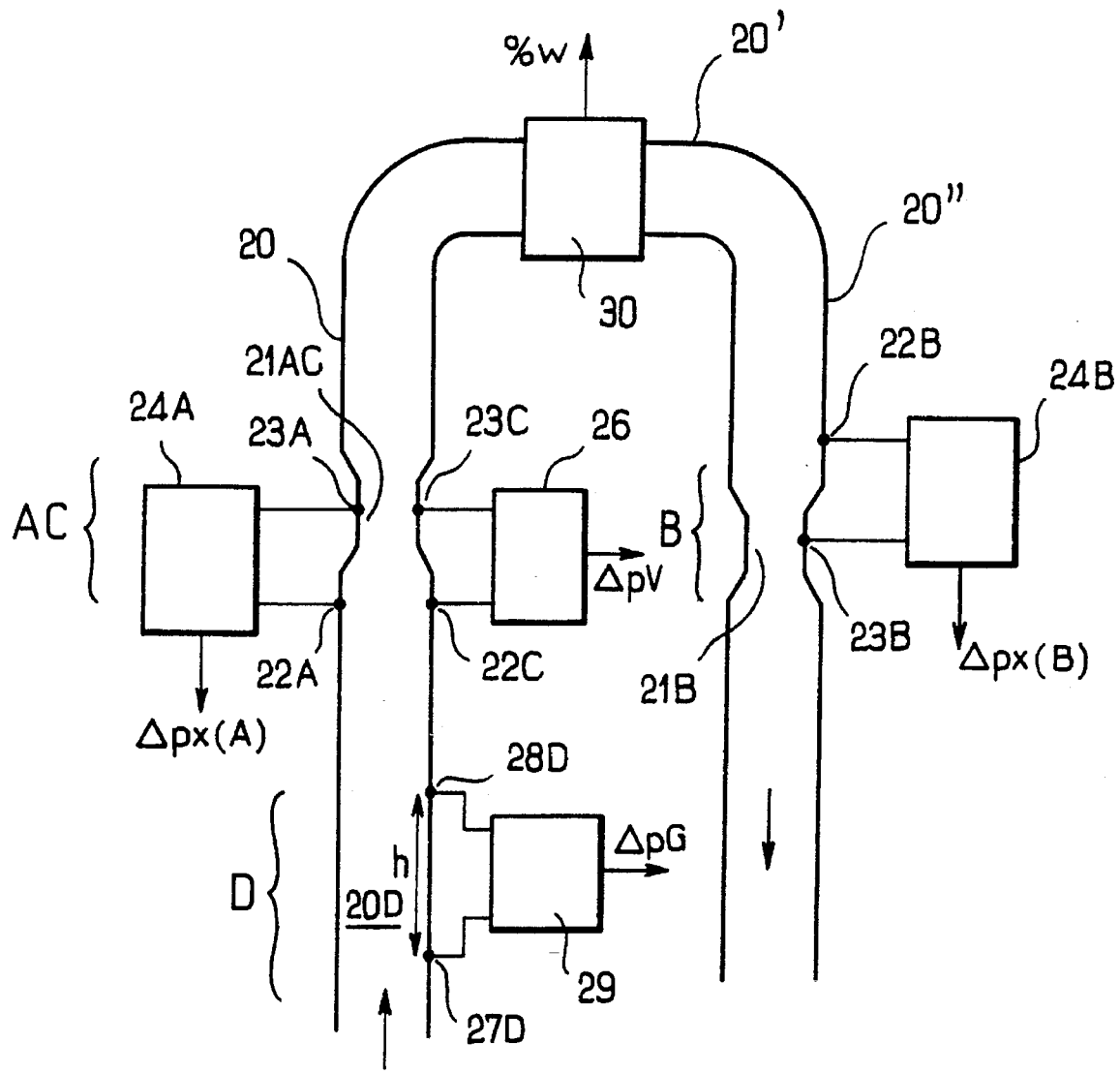
FIG. 3 is a diagram showing a variant embodiment of the FIG. 2 device.

FIG. 3 shows an advantageous variant embodiment of the FIG. 2 device, in which a single venturi 21AC replaces the venturis 21A and 21C of FIG. 2. The measurement sections A and C of FIG. 2 now coincide in a single section AC.

It may be observed that the venturi 21AC is associated, as in FIG. 2, with two differential pressure sensors 24A and 26. The reason for retaining two distinct sensors is that the set of characteristics required for a sensor depends on the use to which the measurements are put. The characteristics that are desirable with respect to accuracy, resolution, and band width are very different depending on whether the measurements are used for obtaining an absolute value, as is the case for the signals ΔpV, or merely a relative value, as is the case for the signals ΔpX which are subjected to correlation processing. Although in theory it is not impossible that a sensor could exist that is suitable for both purposes, in the present state of affairs, such a sensor is not available. FIG. 3 also shows two pairs of pressure takeoffs 22A, 23A and 22C, 23C connected respectively to the sensors 24A and 26. However it would be possible to use a single pair of pressure takeoffs for the section AC and connected to both differential pressure sensors. An alternative embodiment, not shown, includes a plurality of pairs of pressure takeoffs located at angularly distributed positions on the flow duct so as to remove the effect of local variations and provide pressure difference measurements averaged for a given flow section.

Such an embodiment may comprise for instance four pairs of pressure takeoffs angularly distributed i.e. at 90° spacings, and the takeoffs are connected so as to provide for each pressure difference two measurements at diametrically opposite positions, which are averaged in any appropriate manner.

Figure 4:
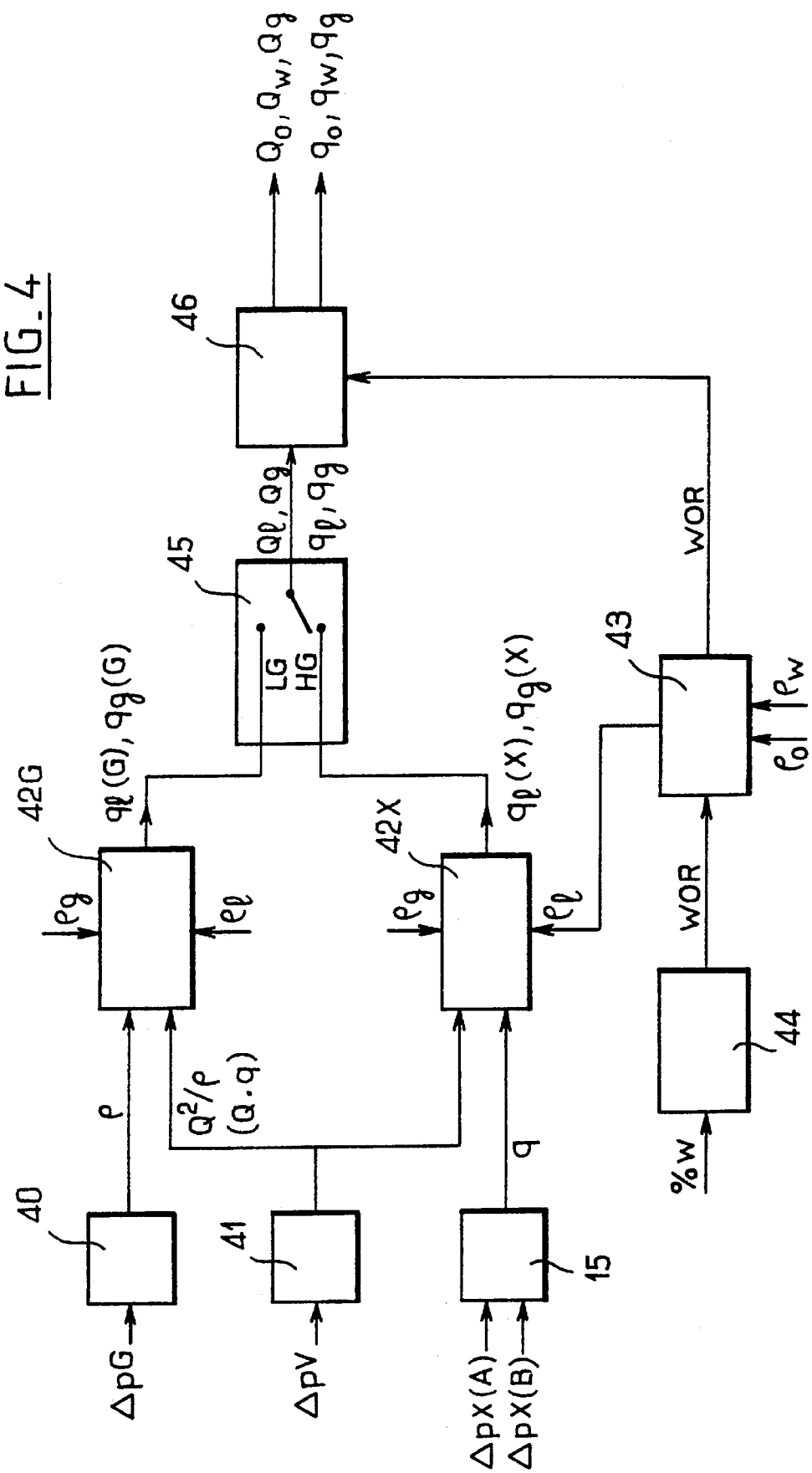
FIG. 4 is a block diagram showing the processing applied to the information provided by the device of FIG. 2 or of FIG. 3.

FIG. 4 is a block diagram showing one way of processing the information provided by a device as described above with reference to FIGS. 2 and 3. The following description refers to the case where the multiphase fluid is an oilwell effluent. The magnitudes Q (mass flow rate), q (volume flow rate), and ρ (density) are associated with the following indices: g (gas), l (liquid), o (oil), and w (water); while the absence of an index means, as above, the total flow rate or the density of the mixture.

In the explanation below, it is assumed that the densities $\rho_o$, $\rho_w$, and $\rho_g$ of the components of the multiphase fluid are known.

Processing is based on the following principle. As explained above, providing the gas fraction is not too great then the gradio-venturi, in combination with a sensor for water fraction, suffices to provide information enabling the flow rates of the fluids to be determined, namely a signal representative of the density ρ of the mixture and a signal ΔpV representative of the expression $Q^2/\rho$. When there is a large gas fraction, e.g. greater than 65%, the density measurement provided by the gradiomanometer becomes unusable. However, even when there is a large gas fraction, the information obtained by correlating the differential pressure signals ΔpX and representative of the total volume flow rate q makes it possible in combination with the information ΔpV from the gradio-venturi to calculate the total mass of flow rate Q. If the density ρ of the mixture is not available, the expression $Q^2/\rho$ can be expressed in the form of the product Q.q, and given the volume flow rate q, it is possible to determine the mass flow rate Q.

The mass flow rate Q is calculated continuously via two parallel paths, the first on the basis of the signals ΔpV and ΔpG provided by the gradio-venturi, and the second on the basis of the signal ΔpV and the signal obtained by correlation of the signals ΔpX. Two possible values are thus obtained for the mass flow rate Q, one of which is appropriate when the gas content is moderate, while the other is appropriate when the gas content is high. Given the densities of the individual phases, and also the density $\rho_l$ of the liquid fraction, which is obtained from the measurement of the water fraction, values of the gas flow rate $Q_g$ and $q_g$ and of the liquid flow rate $Q_l$ and $q_l$ are calculated that correspond respectively to the two values of the flow rate Q. On the basis of each of the resulting pairs of values $q_g$, $q_l$, a gas content is calculated. In addition, by tracing curves showing the accuracy of measurements as a function of gas content, the limiting value of gas content beyond which the accuracy of the information ΔpG from the gradiomanometer becomes unacceptable is established beforehand. The limit value depends on numerous parameters (characteristics of the sensors, architecture of the device, properties of the fluid, . . . ). The gas content values obtained as mentioned above are compared with said limit value and a selection is made accordingly.

This kind of processing is illustrated by the block diagram of FIG. 4. The signals from the gradio-venturi sensors are processed by modules 40 and 41 that provide data representative of the density and of the expression $Q^2/\rho$ or Q.q. The volume flow rate q is provided by the correlator 15 as described with reference to FIG. 1. A module 42G corresponding to the first above-mentioned path calculates a value for the mass flow rate Q(G) on the basis of data coming from the modules 40 and 41. The module 42G receives the information $\rho_l$ (density of the liquid phases) from a module 43 connected to a module 44 for processing the signals from the sensor 30 in FIG. 2. Given the gas density $\rho_g$ and the liquid density $\rho_l$, the module 42G provides corresponding values for the gas flow rate $Q_g(G)$ and $q_g(G)$ and for the liquid flow rate $Q_l(G)$ and $q_l(G)$. The module 42X corresponding to the second path calculates the corresponding values $Q_g(X)$, $q_g(X)$ and $Q_l(X)$, $q_l(X)$ on the basis of the data coming from the module 41 and from the correlator 15. The two sets of values are applied to a selector module 45 which calculates a gas content value on the basis of the gas and liquid flow rate values, and it compares said value with said limit value mentioned above in order to select between the two sets of values, with selection being symbolized by a switch having two positions, LG (moderate gas content) and HG (high gas content). The values selected are applied to a module 46 which also receives the value for the water fraction WOR. This module provides the flow rates for each of the phases.

Figure 5:
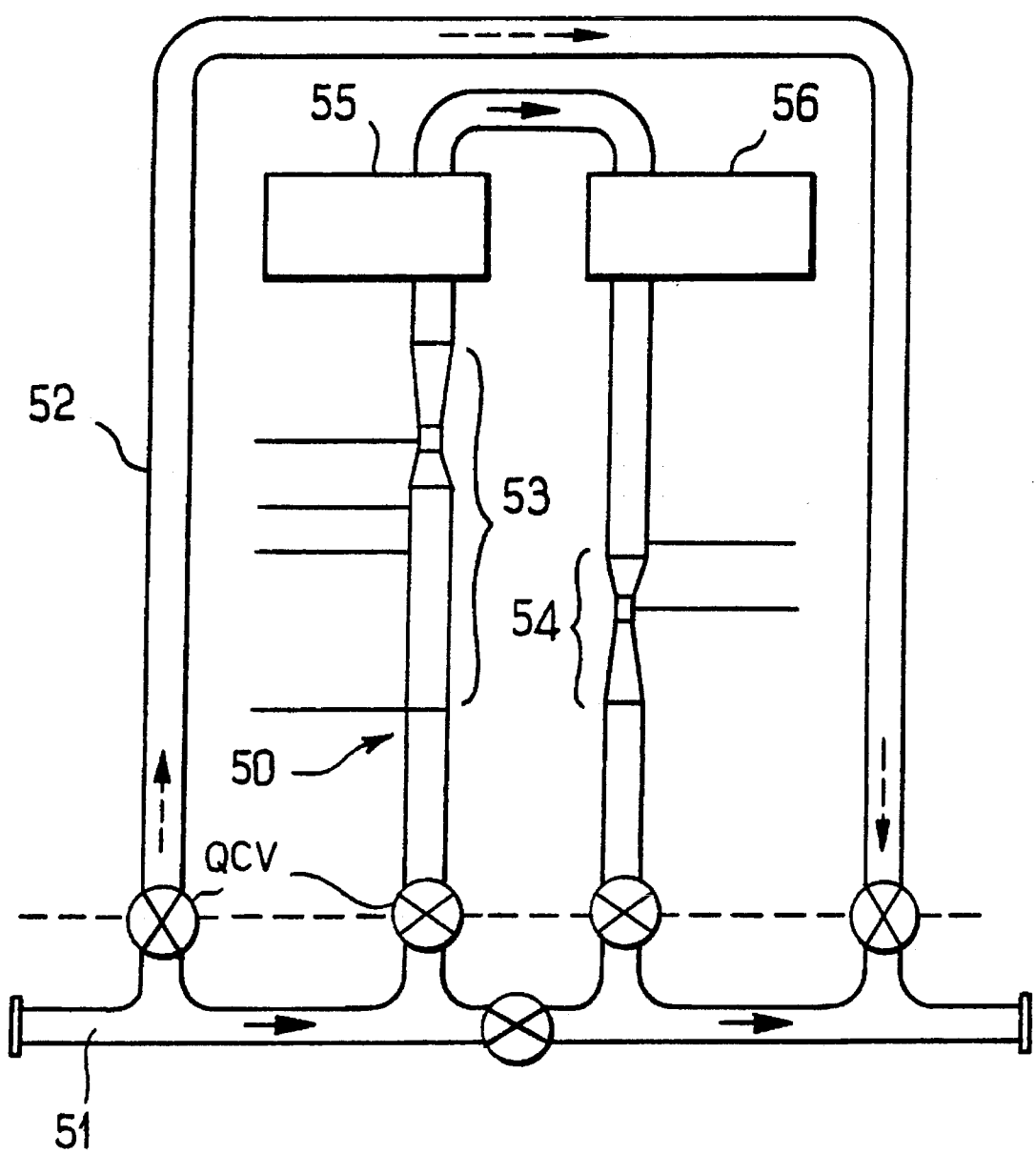
FIG. 5 shows a possible disposition for the device of FIG. 3.

FIG. 5 shows one possible disposition of the device of FIG. 3. This disposition corresponds to the architecture described in above-mentioned patent application WO 93/17305, to which reference may be made for further details. A measurement circuit 50 in the general form of an upside-down U-shape is mounted in shunt on the horizontal duct 51 via which the fluid is conveyed. A bypass circuit 52 is provided for temporarily confining a certain volume of fluid for analysis purposes. Quick closing valves QCV control fluid access to the various ducts. A gradio-venturi 53 is provided in the up branch of the circuit 50. A venturi 54 is provided in the down branch of the circuit 50. According to the teaching of the above-mentioned patent application, this disposition of the measurement circuit makes it possible to compensate for slip between phases.

The elements 55 and 56 mounted on the measurement circuit represent respectively a water fraction sensor and a multiphase analysis device operating on samples such as an isokinetic sampling device.

Other elements (not shown) are also provided such as absolute pressure sensors and temperature sensors. The information obtained is used for calculating densities $\rho_o$, $\rho_w$, $\rho_g$ under the conditions of the flow. In addition, a device may be provided to homogenize the fluid as it enters the measurement circuit.

FIG. 6 shows another possible disposition that is more compact, and in which all of the measurement means are disposed on a vertical section of duct 60. In this disposition, the gradio-venturi 61 has its venturi section 62 placed upstream from the constant section gradiomanometer section 63. This disposition has a favorable influence on the quality of the measurements provided by the gradiomanometer, because of the homogenizing effect of the upstream venturi 62 on the fluid. The second venturi 64 is placed immediately after the gradiomanometer section 63 at an appropriate distance L from the venturi 62 for correlation purposes. In addition, provision is made to measure the water fraction at the gradiomanometer section 63 by means of a sensor represented by block 65. A device for multiphase analysis by sampling (not shown) may also be mounted on the duct 60, e.g. up stream from the gradio-venturi.

We claim:

1. A method of measuring flow rate for a multiphase fluid, such as the effluent of an oilwell, which may contain a mixture of liquid hydrocarbons, gas, and water, comprising the steps of:

changing the flow velocity respectively in a first section and in a second section situated at a distance from each other in the flow direction to produce a first and a second pressure difference;

measuring said first and second pressure differences to obtain a first and a second pressure difference signals; and determining a time lag corresponding to maximum correlation between said first and second pressure difference signals to derive a third signal indicative of the total volume flow rate q.

2. A method according to claim 1, in which said third signal is formed by cross-correlation between the first and second pressure difference signals.

3. A method according to claim 1, in which said measuring step comprises the steps of measuring pressure differences at a plurality of angular positions distributed around the respective sections, and averaging the plurality of measurements thus produced to obtain said first and second signals.

4. A method according to claim 1, in which a further pressure difference resulting from a change in flow velocity is measured in a flow section to obtain a fourth signal that is a function of the total mass flow rate Q and of the density $\rho$ of the mixture, and a fifth signal is formed representative of said density $\rho$.

5. A method according to claim 4, in which said signal representative of the density $\rho$ is formed by measuring a static pressure difference between two points in the flowing multiphase fluid spaced from each other in the vertical direction.

6. A method according to claim 4, in which said flow section is one of the first and second sections.

7. A method according to claim 6, in which said further pressure difference is measured at positions angularly distinct from the positions at which said first or second pressure differences are measured.

8. A method according to claim 4, in which said flow section is distinct from said first and second sections.

9. A method according to claim 4, in which two possible values for the total mass flow rate Q are formed: a first value from the fourth signal which is a function both of the total mass flow rate Q and of the density $\rho$ of the fluid, and also from the fifth signal which is representative of the density $\rho$; and a second value from said fourth signal and from the third signal which is representative of the total volume flow rate q, the first value being appropriate when the gas fraction of the fluid is moderate and the second value being appropriate when the gas fraction is high.

10. A method according to claim 9, in which the density $\rho_l$ of the liquid fraction of the fluid is determined, with the first and second values of the total flow rate and of the density $\rho_l$ of the liquid fraction being used to determine respectively first and second values of the gas flow rate and of the liquid flow rate, the corresponding gas content is determined, and one of the first and second values is selected by comparing the resulting gas content with a preestablished limit value.

11. A method according to claim 10, in which the density $\rho_l$ is determined on the basis of a measurement of the fraction of one of the liquid phases.

12. A method according to claim 1, wherein the flowing multiphase fluid comprises a mixture of fluids flowing from a well.

13. A method according to claim 12, wherein the mixture comprises water, oil and gas.

14. A device for measuring the flow rate of a multiphase fluid, comprising:

first and second sections spaced from each other in the flow direction, each including a passage provided with means for inducing a change of velocity therein; and first and second means for measuring a pressure difference along respectively said first and second sections and generating first and second pressure difference signals suitable for cross-correlation with each other, said cross-correlation producing a third signal indicative of the total volume flow rate.

15. A device according to claim 14, in which each of said passages includes a venturi.

16. A device according to claim 15, in which each of said first and second measuring means comprises a pressure takeoff located upstream of said venturi and another pressure takeoff located in said venturi.

17. A device according to claim 15, in which each of said first and second measuring means comprises a pressure takeoff located in said venturi and another pressure takeoff located downstream of said venturi.

18. A device according to claim 15, in which each of said first and second measuring means comprises a pressure takeoff located upstream of the venturi and another pressure takeoff located downstream of the venturi.

19. A device according to claim 15, in which each of said sections comprises a plurality of angularly distributed pairs of pressure takeoffs spaced from each other in the flow direction.

20. A device according to claim 14, comprising a third section including a passage provided with means for inducing a change of velocity therein, and third means for measuring a pressure difference along said third section, the signal obtained being a function of the total mass flow rate and of the density $\rho$ of the mixture, and a fourth section where the flow is upward, provided with means for measuring the static pressure difference between two points spaced from each other in the vertical direction, said pressure difference being indicative of the density $\rho$ of the mixture.

21. A device according to claim 20, in which said third means is distinct from said first means.

22. A device according to claim 20, in which the third section coincides with said first section.

23. A device according to claim 22, in which said third means includes a plurality of pairs of pressure takeoffs arranged at angularly distributed locations.

24. A device according to claim 14, in which the fluid flows upwards in the first section and downwards in the second section.

25. A device according to claim 14, for measuring the flow rate of the effluent of an oil well containing a mixture of liquid hydrocarbons, gaseous hydrocarbons, and water, the device comprising a gradio-venturi that includes a venturi mounted upstream from a gradiomanometer section of a constant section, and a second venturi placed downstream from the gradio-venturi.

26. A device according to claim 25, in which the second venturi is placed immediately after the gradio-venturi.

27. A device according to claim 25, including a sensor responsible to water fraction, and placed at the level of the gradiomanometer section.

28. A device according to claim 27, wherein the first and second sections and first and second means are located in a pipe which receives fluids flowing from a well.

29. A device according to claim 28, wherein the fluid comprise a mixture of water, oil and gas.

30. A method of determining the production from a well, comprising:

(a) measuring flow rate of multiphase fluids flowing from the well by changing the flow velocity of the flowing multiphase fluid respectively in a first section and in a second section spaced from each other in the flow direction of the fluids; measuring pressure differences along respectively said first and said second section to obtain a first and a second pressure difference signals; and comparing said first and second pressure difference signals to derive a third signal indicative of the total volume flow rate q of the flowing multiphase fluid; and (b) using the measured flow rate to determine the production from the well.

* * * * *